(No Model.)

C. MIRE & P. JUDICE, Jr.
CAR COUPLING.

No. 534,903. Patented Feb. 26, 1895.

WITNESSES:
Fred G. Dieterich
P. B. Turpin.

INVENTORS:
Clement Mire.
Paul Judice, Jr.
BY Munn & Co.
ATTORNEYS

UNITED STATES PATENT OFFICE.

CLEMENT MIRE AND PAUL JUDICE, JR., OF DONALDSONVILLE, LOUISIANA.

CAR-COUPLING.

SPECIFICATION forming part of Letters Patent No. 534,903, dated February 26, 1895.

Application filed May 21, 1894. Serial No. 511,920. (No model.)

*To all whom it may concern:*

Be it known that we, CLEMENT MIRE and PAUL JUDICE, Jr., of Donaldsonville, in the parish of Ascension and State of Louisiana, have invented a new and useful Improvement in Car-Couplings, of which the following is a specification.

Our invention is an improvement in car-couplings and consists in the novel constructions, combinations and arrangements of parts as will be hereinafter described and pointed out in the claims.

Figure 1:
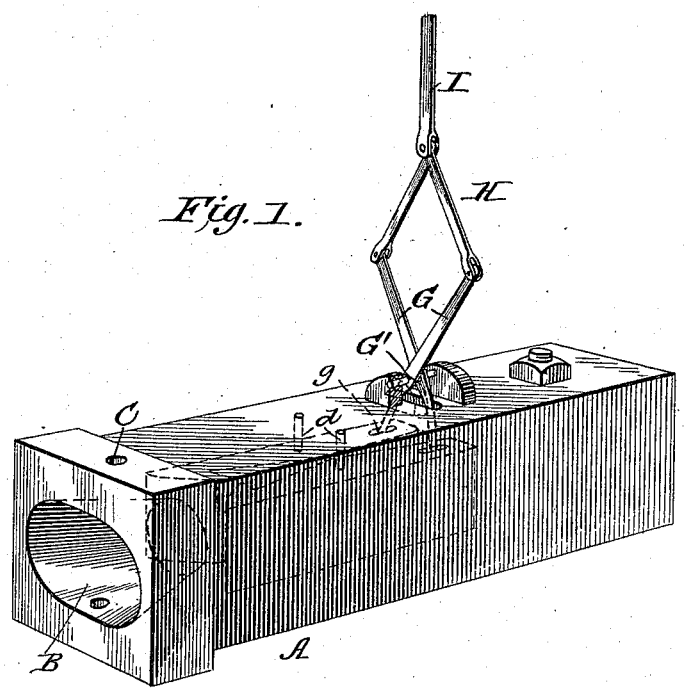
Figure 2:
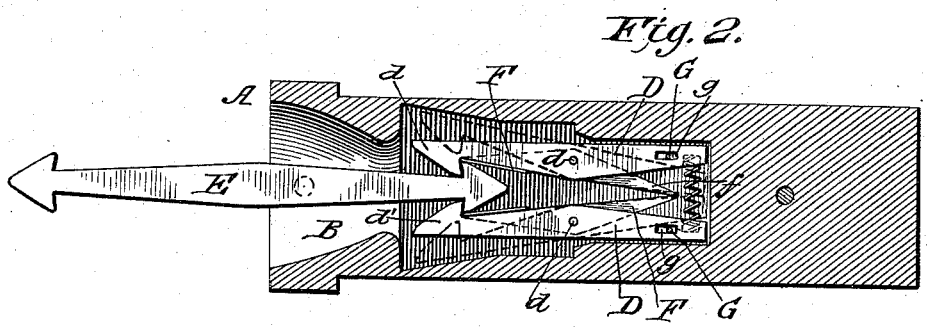
Figure 3:
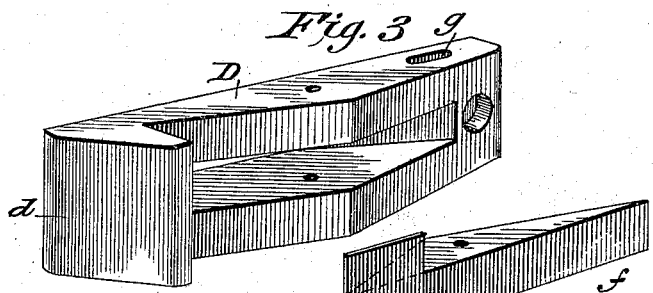

In the drawings—Figure 1 is a perspective view of the coupling, parts being shown in dotted lines. Fig. 2 is a horizontal section of the draw-head with the coupling hooks and detachers in place, and Fig. 3 is a detail view illustrating the coupling hooks and detachers.

The draw-head A may in general respects be of ordinary form having a link mortise B and a pin hole C intersecting the same so that the draw-head may be coupled by an ordinary link, but manifestly the form of the draw-head may be varied, its purpose in the present instance being primarily to afford a support for the coupling hooks D which are pivoted at *d* and have at or near their front ends hooks *d'* to secure the coupling bar E which is preferably headed as shown.

By preference the coupling hooks are arranged in pairs disposed reversely and opposite each other so that the hook of one will face that of the other and both will secure the arrow like head of the coupling bar, but it will be understood that one of the coupling hooks may be used in connection with its detacher within the scope of our invention.

The detachers F are pivoted between their ends preferably on a common pivot with the coupling hooks and are formed in rear of such pivot with shank like portions *f* which abut each other and prevent the ejecting or detaching portion *f'* from moving outward and so operate to eject the coupling bar as the hooks are pressed outward by the operating devices presently described. These ejecting portions *f'* fit in the hooks proper and preferably extend from top to bottom of same as shown in Fig. 3 so that such portion will serve to force the coupling bar out of engagement with the hooks.

The rear arms of the coupling hooks form shanks and are engaged by the operating levers G G being preferably provided with recesses *g g* to receive the points of the levers G G. The latter are pivoted at G' having their lower ends engaged with the coupling hooks by fitting in the sockets. The upper ends of the levers connect with the lower ends of the arms H and the upper ends of said arms are jointed to the push rod I which may be operated directly or by connection with suitable levers, crank shafts or other operating devices as may be desired.

Having thus described our invention, what we claim as new, and desire to secure by Letters Patent, is—

1. In a car coupling, the combination of the pair of pivoted coupling hooks, the pair of detachers having ejecting portions and operating mechanism, substantially as set forth.

2. In a car coupling, the combination of the coupling hooks pivoted between their ends and having their front ends hooked and their rear ends extended forming shanks, the detachers pivoted concentrically with the coupling hooks and having the front ejecting portions and the rear abutting portions and levers connected with the coupling hooks, substantially as set forth.

3. A car coupling comprising a pivoted hook and a pivoted detacher having an ejecting portion arranged and operating in the coupling hook the pivots of the hook and detacher being concentric substantially as set forth.

4. The combination in a car coupling of the pair of coupling hooks and the pair of detachers pivoted and having shank like portions arranged to abut, and ejecting portions operating in the hooks substantially as set forth.

5. An improved car coupling comprising a pair of coupling hooks, and a pair of detachers operating within said hooks, said detachers being pivoted between their ends and provided at the front ends with ejecting portions and at their rear ends with shanks, all substantially as and for the purposes set forth.

6. The combination in a car coupling of the coupling hooks the levers pivoted between their ends and engaged at one end with the coupling hooks a pair of arms jointed at their ends to said levers and operating devices connected with said arms substantially as set forth.

7. The combination in a car coupling of the pairs of coupling hooks pivoted between their ends and having their forward arms hooked and their rear arms extended to form shanks, the detachers pivoted between their ends and having their front arms formed to fit in the hooked portions of the coupling arms and their rear arms forming shanks arranged to abut and operating devices engaging the shank arms of the detachers all substantially as and for the purposes set forth.

CLEMENT MIRE.
PAUL JUDICE, JR.

Witnesses:
J. F. FERNANDEZ,
LOUIS DUFFEL.